United States Patent
Fujioka

(10) Patent No.: US 11,658,283 B2
(45) Date of Patent: May 23, 2023

(54) LITHIUM ION SECONDARY BATTERY

(71) Applicant: Murata Manufacturing Co., Ltd., Nagaokakyo (JP)

(72) Inventor: Masato Fujioka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 467 days.

(21) Appl. No.: 16/562,471

(22) Filed: Sep. 6, 2019

(65) Prior Publication Data
US 2019/0393481 A1 Dec. 26, 2019

Related U.S. Application Data

(63) Continuation of application No. PCT/JP2018/004451, filed on Feb. 8, 2018.

(30) Foreign Application Priority Data

Mar. 31, 2017 (JP) .............................. JP2017-071636

(51) Int. Cl.
*H01M 4/13* (2010.01)
*H01M 4/36* (2006.01)
(Continued)

(52) U.S. Cl.
CPC ........... *H01M 4/139* (2013.01); *H01M 4/364* (2013.01); *H01M 4/621* (2013.01); *H01M 10/0525* (2013.01)

(58) Field of Classification Search
None
See application file for complete search history.

(56) References Cited

U.S. PATENT DOCUMENTS

2002/0028380 A1  3/2002  Tanjo et al.
2009/0139787 A1* 6/2009  Ohsawa ............ H01M 10/0525
                                                                180/68.5
(Continued)

FOREIGN PATENT DOCUMENTS

JP   H08138650 A    5/1996
JP   H09320569 A   12/1997
(Continued)

OTHER PUBLICATIONS

International Search Report issued for PCT/JP2018/004451, dated Apr. 10, 2018.

*Primary Examiner* — Maria Laios
*Assistant Examiner* — Angela J Martin
(74) *Attorney, Agent, or Firm* — ArentFox Schiff LLP

(57) ABSTRACT

A lithium ion secondary battery that includes a positive electrode, a negative electrode, a separator, and a nonaqueous electrolytic solution. Among resistance values of at least three of the following resistance components: diffusion resistance of Li ions in the nonaqueous electrolytic solution; ohmic resistance of the nonaqueous electrolytic solution; ohmic resistance of a positive electrode mixture layer, ohmic resistance of a negative electrode mixture layer; reaction resistance of a surface of a positive electrode active material, reaction resistance of a surface of a negative electrode active material; and diffusion resistance of Li ions in the positive electrode mixture layer, diffusion resistance of Li ions in the negative electrode mixture layer, the resistance values at a position of a mixture layer nearest a current collector are smaller than the resistance values at a position of a mixture layer nearest a separator.

10 Claims, 2 Drawing Sheets

(51) Int. Cl.
    *H01M 4/62*           (2006.01)
    *H01M 10/05*         (2010.01)
    *H01M 4/139*        (2010.01)
    *H01M 10/0525*     (2010.01)

(56) References Cited

U.S. PATENT DOCUMENTS

| | | |
|---|---|---|
| 2009/0202907 A1 | 8/2009 | Muraoka |
| 2014/0030595 A1* | 1/2014 | Kishimi ............ H01M 10/0525 |
| | | 429/218.1 |
| 2014/0127572 A1* | 5/2014 | Ozaki ............... H01M 10/0525 |
| | | 429/211 |
| 2014/0287316 A1 | 9/2014 | Ahn et al. |
| 2015/0171414 A1* | 6/2015 | Takahata ............... H01M 4/587 |
| | | 429/212 |
| 2016/0006030 A1* | 1/2016 | Saka .................... H01M 4/366 |
| | | 429/61 |
| 2016/0011274 A1* | 1/2016 | Morita .................. H01M 10/48 |
| | | 702/63 |
| 2016/0211505 A1 | 7/2016 | Yamazaki |
| 2017/0077502 A1* | 3/2017 | Kishimoto ............. C01G 53/54 |
| 2018/0076633 A1* | 3/2018 | Fujita .................. H01M 10/425 |

FOREIGN PATENT DOCUMENTS

| | | | | |
|---|---|---|---|---|
| JP | H1125956 A | | 1/1999 | |
| JP | 2002151055 A | | 5/2002 | |
| JP | 2008311164 A | | 12/2008 | |
| JP | 2015050055 A | | 3/2015 | |
| JP | 2015511389 A | | 4/2015 | |
| WO | WO 2011109815 | * | 9/2011 | ............ H01M 4/587 |
| WO | WO 2016116434 | * | 7/2016 | .............. H01M 4/66 |

* cited by examiner

LITHIUM ION SECONDARY BATTERY

CROSS REFERENCE TO RELATED APPLICATIONS

The present application is a continuation of International application No. PCT/JP2018/004451, filed Feb. 8, 2018, which claims priority to Japanese Patent Application No. 2017-071636, filed Mar. 31, 2017, the entire contents of each of which are incorporated herein by reference.

FIELD OF THE INVENTION

The present invention relates to a lithium ion secondary battery.

BACKGROUND OF THE INVENTION

There is known a lithium ion secondary battery including: a positive electrode having a positive electrode current collector and a positive electrode mixture layer formed on a surface of the positive electrode current collector; a negative electrode having a negative electrode current collector and a negative electrode mixture layer formed on a surface of the negative electrode current collector; a separator positioned between the positive electrode and the negative electrode; and a nonaqueous electrolytic solution.

In such a lithium ion secondary battery, for example, a configuration is conceivable in which the capacity per unit electrode area is increased by thickening a mixture layer of an electrode in order to improve the energy density and reduce the production cost.

However, when the thickness of the mixture layer is increased, the frequency of use of an active material at a position nearest the separator becomes higher than that at a position nearest the current collector during charge and discharge of the battery, and thus a uniform reaction in the mixture layer is reduced. Consequently, as the charge and discharge cycle of the battery proceeds, the deterioration of the active material at the position nearest the separator proceeds, and thus the cycle characteristics of the battery deteriorate.

Therefore, Patent Document 1 describes an electrode in which an internal structure in a thickness direction of a mixture layer is higher in density or lower in porosity than an external surface portion, thereby achieving a uniform reaction in the thickness direction.

Further, Patent Document 2 describes an electrode in which a specific surface area of active material particles (in a thickness direction of a mixture layer) at a position nearest a current collector is larger than that at a position nearest a separator, thereby achieving a uniform reaction in the thickness direction.

Patent Document 1: Japanese Patent Application Laid-Open No. H8-138650
Patent Document 2: Japanese Patent Application Laid-Open No. H11-25956

SUMMARY OF THE INVENTION

Each of the electrodes described in Patent Documents 1 and 2 has a structure in which, among a resistance value of one resistance component among a plurality of resistance components of the electrode, the resistance value at the position nearest the current collector is smaller than that at the position nearest the separator.

However, since the plurality of resistance components is present in the electrode, the uniform reaction effect is limited when the resistance value of only the one resistance component at the position nearest the current collector is smaller than that at the position nearest the separator.

Further, since the resistance component that is the main cause of the decrease in uniform reaction in the mixture layer differs depending on the difference in the battery structure or the like, it is not possible to effectively achieve the uniform reaction in the mixture layer even if a structure is configured such that, among a resistance value of a resistance component different from the resistance component (i.e., the main cause of the decrease in uniform reaction), the resistance value at the position nearest the current collector is smaller than that at the position nearest the separator.

The present invention is directed at solving these problems, and provides a lithium ion secondary battery in which cycle characteristics are improved by enhancing the uniformity of a charge-discharge reaction in a thickness direction of a mixture layer of an electrode.

The lithium ion secondary battery of the present invention includes: a positive electrode; a negative electrode, wherein each of the positive electrode and the negative electrode have a current collector and a mixture layer on a surface of the current collector and which contains an active material; a separator positioned between the positive electrode and the negative electrode; and a nonaqueous electrolytic solution, where, among resistance values of at least three of the following eight resistance components:

(1) diffusion resistance of lithium ions in the nonaqueous electrolytic solution which permeates at least one of the positive electrode and the negative electrode;

(2) ohmic resistance of the nonaqueous electrolytic solution which permeates at least one of the positive electrode and the negative electrode;

(3) ohmic resistance of the mixture layer of the positive electrode;

(4) ohmic resistance of the mixture layer of the negative electrode, (5) reaction resistance on a surface of the active material of the positive electrode;

(6) reaction resistance on a surface of the active material of the negative electrode;

(7) diffusion resistance of lithium ions in the mixture layer of the positive electrode; and (8) diffusion resistance of lithium ions in the mixture layer of the negative electrode, the resistance values at a first position of a mixture layer nearest a current collector are smaller than the resistance values at a second position of a mixture layer nearest the separator, when constant-current charge is performed at a current of 1 C until a voltage at a SOC of 0% reaches a predetermined upper limit voltage and a lithium ion concentration in a positive electrode active material at a SOC of 0% is defined as 1.0, a difference $\Delta c$ in solid phase lithium ion concentration between the position of the mixture layer nearest the separator and the position of the mixture layer nearest the current collector is 0.1 or less, and in a case in which a structure in a thickness direction of the mixture layer is substantially uniform, the at least three resistance components include the top three resistance components having large resistance values among the eight resistance components.

The lithium ion secondary battery may be configured such that, when one of the at least three resistance components is the resistance component described in (1), a void rate in the mixture layer at the position nearest the current collector is lower than the void rate in the mixture layer at the position nearest the separator.

The lithium ion secondary battery may be configured such that, when one of the at least three resistance components is the resistance component described in (2), the void rate in the mixture layer at the position nearest the current collector is lower than the void rate in the mixture layer at the position nearest the separator.

The lithium ion secondary battery may be configured such that, when one of the at least three resistance components is the resistance component described in (3), a content of a conductive auxiliary agent in the positive electrode mixture layer at a position nearest the positive electrode current collector is larger than the content of the conductive auxiliary agent in the positive electrode mixture layer at the position nearest the separator.

The lithium ion secondary battery may be configured such that, when one of the at least three resistance components is the resistance component described in (4), a content of the conductive auxiliary agent in the negative electrode mixture layer at a position nearest the negative electrode current collector is larger than the content of the conductive auxiliary agent in the negative electrode mixture layer at the position nearest the separator.

The lithium ion secondary battery may be configured such that, when one of the at least three resistance components is the resistance component described in (5), a content of a binder in the positive electrode mixture layer at the position nearest the positive electrode current collector is smaller than the content of the binder in the positive electrode mixture layer at the position nearest the separator.

The lithium ion secondary battery may be configured such that, when one of the at least three resistance components is the resistance component described in (6), a content of the binder in the negative electrode mixture layer at the position nearest the current collector is smaller than the content of the binder in the negative electrode mixture layer at the position nearest the separator.

The lithium ion secondary battery may be configured such that, when one of the at least three resistance components is the resistance component described in (7), a particle size of the positive electrode active material at the position nearest the positive electrode current collector is smaller than the particle size of the positive electrode active material at the position nearest the separator.

The lithium ion secondary battery may be configured such that, when one of the at least three resistance components is the resistance component described in (8), a particle size of the negative electrode active material at the position nearest the negative electrode current collector is smaller than the particle size of the negative electrode active material at the position nearest the separator.

Further, the lithium ion secondary battery may be configured such that, in the thickness direction of the mixture layer, the values of the at least three resistance components decrease in at least three stages or more as approaching the position nearest the current collector from the position nearest the separator.

The lithium ion secondary battery of the present invention has a structure in which, in a case in which the structure in the thickness direction of the mixture layer of the electrode is substantially uniform, the at least three of the eight resistance components (1) to (8) include the top three resistance components having large resistance values, the values at the position of the mixture layer nearest the current collector are smaller than the values at the position of the mixture layer nearest the separator, when constant-current charge is performed at a current of 1 C until a voltage at a SOC of 0% reaches a predetermined upper limit voltage, the difference $\Delta c$ in solid phase lithium ion concentration between the position of the mixture layer nearest the separator and the position of the mixture layer nearest the current collector is 0.1 or less, whereby the uniformity of the charge-discharge reaction in the thickness direction of the mixture layer is improved and the local deterioration is suppressed, and thus cycle characteristics are improved.

The resistance values of the eight resistance components (1) to (8) have different sizes when the battery has different structures, however, the lithium ion secondary battery of the present invention is configured such that, among the resistance values of at least the top three resistance components having large resistance values, the resistance values at the position of the mixture layer nearest the current collector are smaller than the resistance values at the position of the mixture layer nearest the separator, whereby the uniformity of the charge-discharge reaction in the thickness direction of the mixture layer can be effectively improved and the cycle characteristics can be effectively improved.

Accordingly, a high improvement effect of the cycle characteristics is caused by the above configuration in which, among the resistance values of at least the top three resistance components having large resistance values, the resistance values at the position of the mixture layer nearest the current collector are smaller than the resistance values at the position of the mixture layer nearest the separator.

DETAILED DESCRIPTION OF THE INVENTION

More specifically, the characteristics of the present invention will be hereinafter described with reference to embodiments of the present invention.

Hereinafter, a lithium ion secondary battery having a structure in which a stacked body formed by alternately stacking a plurality of positive electrodes and a plurality of negative electrodes with a separator interposed therebetween and a nonaqueous electrolytic solution are housed in an exterior body will be described as an example.

Figure 1:
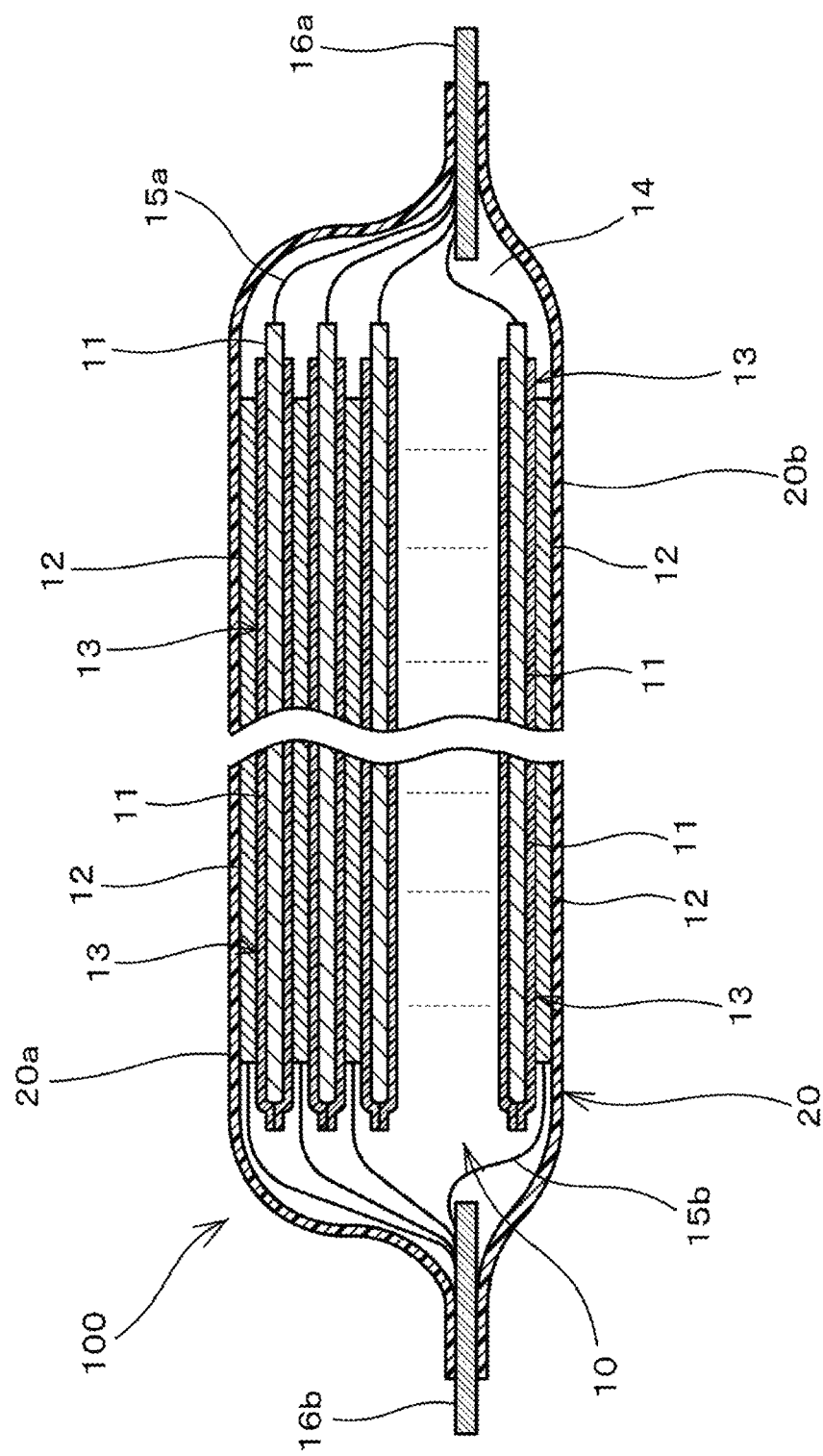
FIG. 1 is a cross-sectional view of a lithium ion secondary battery according to an embodiment of the present invention.

FIG. 1 is a cross-sectional view of a lithium ion secondary battery 100 according to an embodiment of the present invention. The lithium ion secondary battery 100 has a structure in which a stacked body 10 formed by alternately stacking a plurality of positive electrodes 11 and a plurality of negative electrodes 12 with a separator 13 interposed therebetween and a nonaqueous electrolytic solution 14 are housed in a laminate case 20.

The laminate case 20, which is an exterior body, is formed by joining the peripheral portions of a pair of laminate films 20a and 20b by thermal compression bonding.

A positive electrode terminal 16a is led to the outside from one end side of the laminate case 20 and a negative electrode terminal 16b is led to the outside from the other end side. The plurality of positive electrodes 11 is connected to the positive electrode terminal 16a through lead wires 15a. Further, the plurality of negative electrodes 12 is connected to the negative electrode terminal 16b through lead wires 15b.

Figure 2:
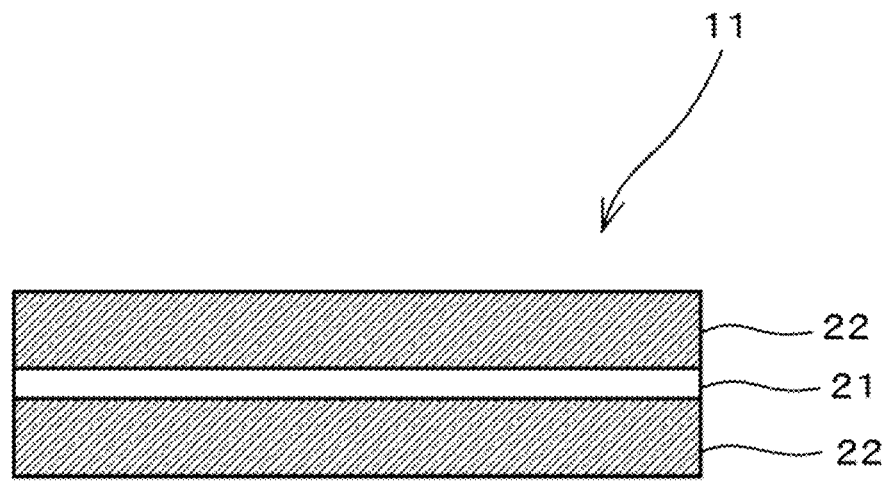
FIG. 2 is a cross-sectional view illustrating a configuration of a positive electrode.

As illustrated in FIG. 2, the positive electrode 11 has a positive electrode current collector 21 and positive electrode mixture layers 22 formed on both surfaces of the positive electrode current collector 21. As the positive electrode current collector 21, for example, a metal foil such as aluminum may be used. The positive electrode mixture layer 22 contains a positive electrode active material, a binder, and a conductive auxiliary agent.

Figure 3:
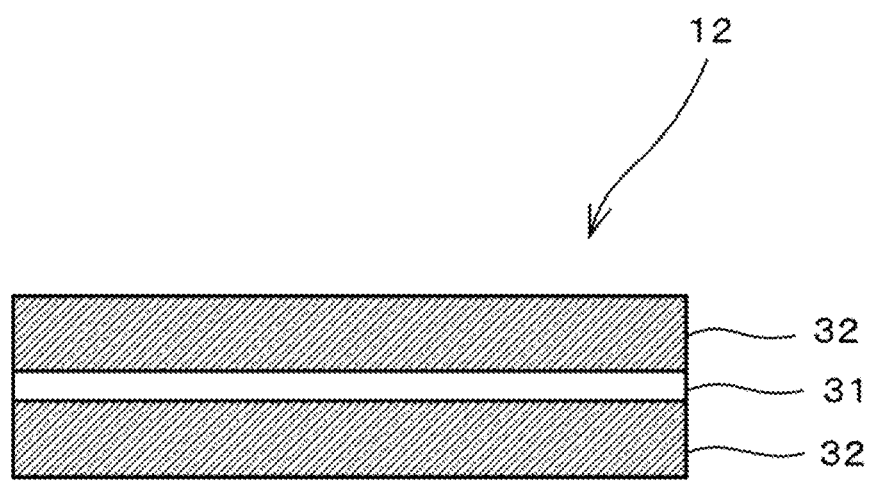
FIG. 3 is a cross-sectional view illustrating a configuration of a negative electrode.

As illustrated in FIG. 3, the negative electrode 12 has a negative electrode current collector 31 and negative electrode mixture layers 32 formed on both surfaces of the negative electrode current collector 31. As the negative electrode current collector 31, for example, a metal foil such as copper may be used. The negative electrode mixture layer 32 contains a negative electrode active material, a binder, and a conductive auxiliary agent.

In the present specification, the direction perpendicular to main surfaces of the positive electrode mixture layer 22 and the negative electrode mixture layer 32, i.e., the stacking direction of the positive electrode 11 and the negative electrode 12 is referred to as "thickness direction". Further, when one or both of the positive electrode 11 and the negative electrode 12 are described without specifying the positive electrode 11 and the negative electrode 12, each of the positive electrode current collector 21 and the negative electrode current collector 31 is referred to as "current collector" without distinction, and each of the positive electrode mixture layer 22 and the negative electrode mixture layer 32 is referred to as "mixture layer" without distinction.

As the separator 13, various separators usable for the lithium ion secondary battery can be used without particular limitation. Although the separator 13 illustrated in FIG. 1 has a bag shape, it may have a sheet shape or may have a zigzag folded shape.

The nonaqueous electrolytic solution 14 may be any nonaqueous electrolytic solution as long as it can be used for the lithium ion secondary battery, and, for example, a known nonaqueous electrolytic solution can be used.

In the lithium ion secondary battery 100 according to this embodiment, among resistance values of at least three of the following resistance components (1) to (8) at a first position nearest a current collector are smaller than the values at a second position nearest the separator 13:

(1) Diffusion resistance of lithium ions in the nonaqueous electrolytic solution 14 which permeates at least one of the positive electrode 11 and the negative electrode 12

(2) Ohmic resistance of the nonaqueous electrolytic solution 14 which permeates at least one of the positive electrode 11 and the negative electrode 12

(3) Ohmic resistance of the positive electrode mixture layer 22

(4) Ohmic resistance of the negative electrode mixture layer 32

(5) Reaction resistance on a surface of the positive electrode active material in the positive electrode mixture layer 22

(6) Reaction resistance on a surface of the negative electrode active material in the negative electrode mixture layer 32

(7) Diffusion resistance of lithium ions in the positive electrode mixture layer 22

(8) Diffusion resistance of lithium ions in the negative electrode mixture layer 32

Here, in a case in which the structure in the thickness direction of the electrode mixture layer is substantially uniform, the at least three resistance components include the top three resistance components having large resistance values among the eight resistance components.

Further, in the lithium ion secondary battery 100 according to this embodiment, when constant-current charge is performed at a current of 1 C until a voltage at a SOC (State of charge) of 0% reaches a predetermined upper limit voltage and a lithium ion concentration in a positive electrode active material at a SOC of 0% is defined as 1.0, a difference Δc in solid phase lithium ion concentration between the position nearest the separator 13 and the position nearest the current collector is 0.1 or less, in a mixture layer in which the resistance values of the at least three resistance components are different between the position nearest the separator 13 and the position nearest the current collector.

In order to achieve such characteristics, a lithium ion secondary battery having a structure in which the thickness of the mixture layer is relatively thick or a structure in which the capacity per unit electrode area is relatively large is used.

Here, in the lithium ion secondary battery 100 according to this embodiment, when one of the at least three resistance components is "(1) Diffusion resistance of lithium ions in the nonaqueous electrolytic solution 14 which permeates at least one of the positive electrode 11 and the negative electrode 12" or "(2) Ohmic resistance of the nonaqueous electrolytic solution 14 which permeates at least one of the positive electrode 11 and the negative electrode 12", the lithium ion secondary battery is configured such that the void rate in the mixture layer of the electrode at the first position nearest the current collector is lower than that at the second position nearest the separator 13, whereby the resistance component (1) or (2) at the first position nearest the current collector is smaller than that at the second position nearest the separator 13.

Further, when one of the at least three resistance components is "(3) Ohmic resistance of the positive electrode mixture layer 22", the lithium ion secondary battery is configured such that the content of the conductive auxiliary agent in the positive electrode mixture layer 22 at the position nearest the positive electrode current collector 21 is larger than that at the position nearest the separator 13, whereby the ohmic resistance of the positive electrode mixture layer 22 at the position nearest the positive electrode current collector 21 is smaller than that at the position nearest the separator 13.

Further, when one of the at least three resistance components is "(4) Ohmic resistance of the negative electrode mixture layer 32", the lithium ion secondary battery is configured such that the content of the conductive auxiliary agent in the negative electrode mixture layer 32 at the position nearest the negative electrode current collector 31 is larger than that at the position nearest the separator 13, whereby the ohmic resistance of the negative electrode mixture layer 32 at the position nearest the negative electrode current collector 31 is smaller than that at the position nearest the separator 13.

Further, when one of the at least three resistance components is "(5) Reaction resistance on the surface of the positive electrode active material", the lithium ion secondary battery is configured such that the content of the binder in the positive electrode mixture layer 22 at the position nearest the positive electrode current collector 21 is smaller than that at the position nearest the separator 13, whereby the reaction resistance on the surface of the positive electrode active material at the position nearest the positive electrode current collector 21 is smaller than that at the position nearest the separator 13.

Further, when one of the at least three resistance components is "(6) Reaction resistance on the surface of the negative electrode active material", the lithium ion secondary battery is configured such that the content of the binder in the negative electrode mixture layer 32 at the position nearest the negative electrode current collector 31 is smaller than that at the position nearest the separator 13, whereby the reaction resistance on the surface of the negative electrode active material at the position nearest the negative electrode current collector 31 is smaller than that at the position nearest the separator 13.

Further, when one of the at least three resistance components is "(7) Diffusion resistance of lithium ions in the positive electrode mixture layer 22", the lithium ion secondary battery is configured such that the particle size of the positive electrode active material at the position nearest the positive electrode current collector 21 is smaller than that at the position nearest the separator 13, whereby the diffusion resistance of lithium ions in the positive electrode mixture layer 22 at the position nearest the positive electrode current collector 21 is smaller than that at the position nearest the separator 13.

Further, when one of the at least three resistance components is "(8) Diffusion resistance of lithium ions in the negative electrode mixture layer 32", the lithium ion secondary battery is configured such that the particle size of the negative electrode active material at the position nearest the negative electrode current collector 31 is smaller than that at the position nearest the separator 13, whereby the diffusion resistance of lithium ions in the negative electrode mixture layer 32 at the position nearest the negative electrode current collector 31 is smaller than that at the position nearest the separator 13.

EXAMPLES

[Positive Electrode]

Six types of positive electrodes a1 to a6 shown in Table 1 were produced.

First, a method of producing the positive electrode a1 will be described. The positive electrode a1 has a substantially uniform structure in the thickness direction of the positive electrode mixture layer.

In order to produce the positive electrode a1, lithium cobaltate (LCO) having an average particle size of 15 μm was provided as a positive electrode active material, acetylene black was provided as a conductive auxiliary agent, and polyvinylidene fluoride (PVdF) was provided as a binder. These materials were dispersed in N-methyl-2-pyrrolidone (NMP) so that the weight ratio of LCO:acetylene black:PVdF was 96:2:2, thereby producing a positive electrode slurry.

Then, the produced positive electrode slurry was applied to both surfaces of an aluminum foil using a die coater so that the basis weight of one of the surfaces was 23.0 mg/cm$^2$, the resulting layer was dried and compressed so as to have a void rate of 16% using a roll press machine, and the resultant was cut into a predetermined shape to produce the positive electrode a1.

The positive electrodes a2 to a6 shown in Table 1 can be basically produced by the same production method as the positive electrode a1, but, as described later, the positive electrode mixture layer has a three-layer structure and thus it is necessary to apply the positive electrode slurry three times. Hereinafter, a structure different from the positive electrode a1 and a production step thereof will be mainly described.

The positive electrode a2 is different from the positive electrode a1 in that the positive electrode mixture layer has a three-layer structure having different void rates. Specifically, in the thickness direction of the positive electrode mixture layer of the positive electrode a2, a first layer positioned at the current collector side has a void rate of 12%, a second layer positioned at the center has a void rate of 16%, and a third layer positioned at the separator side has a void rate of 20%.

In order to realize such a structure, a positive electrode slurry was produced by the same method as the positive electrode a1, the slurry was applied to both surfaces of an aluminum foil so that the basis weight was one third of that of the positive electrode a1, and the resulting layer was dried and compressed so as to have a void rate of 12% using a roll press machine to form the first layer. Then, the positive electrode slurry was applied to the top of the first layer so as

TABLE 1

| | Characteristics | Layer | Void rate (%) | Conductive auxiliary agent ratio | Binder ratio | Particle size of the active material (μm) |
|---|---|---|---|---|---|---|
| a1 | Standard | — | 16 | 2.0 | 2.0 | 15 |
| a2 | Difference in void rate | Separator side | 20 | 2.0 | 2.0 | 15 |
| | | Center | 16 | | | |
| | | Current collector side | 12 | | | |
| a3 | Difference in content of the conductive auxiliary agent | Separator side | 16 | 1.5 | 2.0 | 15 |
| | | Center | | 2.0 | | |
| | | Current collector side | | 2.5 | | |
| a4 | Difference in content of the binder | Separator side | 16 | 2.0 | 2.5 | 15 |
| | | Center | | | 2.0 | |
| | | Current collector side | | | 1.5 | |
| a5 | Difference in particle size of the active material | Separator side | 16 | 2.0 | 2.0 | 20 |
| | | Center | | | | 15 |
| | | Current collector side | | | | 10 |
| a6 | Difference in void rate and difference in content of the binder | Separator side | 20 | 2.0 | 2.5 | 15 |
| | | Center | 16 | | 2.0 | |
| | | Current collector side | 12 | | 1.5 | | to have the same thickness as that of the first layer, and the resulting layer was dried and compressed so as to have a void rate of 16% using a roll press machine to form the second layer. Finally, the positive electrode slurry was applied to the top of the second layer so as to have the same thickness as the first and second layers, and the resulting layer was dried and compressed so as to have a void rate of 20% using a roll press machine to form the third layer. Thereafter, the resultant was cut into a predetermined shape to produce the positive electrode a2.

The positive electrode a3 is different from the positive electrode a1 in that the positive electrode mixture layer has a three-layer structure having different contents of the conductive auxiliary agent, i.e., a three-layer structure in which a conductive auxiliary agent ratio, which is a proportion of the conductive auxiliary agent in the positive electrode mixture layer, differs. Specifically, in the thickness direction of the positive electrode mixture layer of the positive electrode a3, a first layer positioned at the current collector side has a conductive auxiliary agent ratio of 2.5, a second layer positioned at the center has a conductive auxiliary agent ratio of 2.0, and a third layer positioned at the separator side has a conductive auxiliary agent ratio of 1.5.

In order to realize such a structure, materials (LCO, acetylene black, and PVdF) were provided to produce positive electrode slurries for forming the first layer, the second layer, and the third layer, and the weight ratios of LCO:acetylene black:PVdF were 95.5:2.5:2, 96:2:2, and 96.5:1.5:2, respectively. Then, the positive electrode slurry for forming the first layer was applied and dried, the positive electrode slurry for forming the second layer was applied and dried, the positive electrode slurry for forming the third layer was applied and dried so that the basis weight of each of the layers was one third of that of the positive electrode a1, and then the resulting layer was dried and compressed to produce the positive electrode a3.

The positive electrode a4 is different from the positive electrode a1 in that the positive electrode mixture layer has a three-layer structure having different contents of the binder, i.e., a three-layer structure in which a binder ratio, which is a proportion of the binder in the positive electrode mixture layer, differs. Specifically, in the thickness direction of the positive electrode mixture layer of the positive electrode a4, a first layer positioned at the current collector side has a binder ratio of 1.5, a second layer positioned at the center has a binder ratio of 2.0, and a third layer positioned at the separator side has a binder ratio of 2.5.

In order to realize such a structure, materials (LCO, acetylene black, and PVdF) were provided to produce positive electrode slurries for forming the first layer, the second layer, and the third layer, and the weight ratios of LCO:acetylene black:PVdF were 96.5:2:1.5, 96:2:2, and 95.5:2:2.5, respectively. Then, the positive electrode slurry for forming the first layer, the positive electrode slurry for forming the second layer, and the positive electrode slurry for forming the third layer were applied in this order and dried so that the basis weight of each of the layers was one third of that of the positive electrode a1, and then the resulting layer was dried and compressed to produce the positive electrode a4.

The positive electrode a5 is different from the positive electrode a1 in that the positive electrode mixture layer has a three-layer structure including positive electrode active materials having different average particle sizes. Specifically, in the thickness direction of the positive electrode mixture layer of the positive electrode a5, the positive electrode active material in a first layer positioned at the current collector side has an average particle size of 10 µm, and the positive electrode active material in a second layer positioned at the center has an average particle size of 15 µm, and the positive electrode active material in a third layer positioned at the separator side has an average particle size of 20 µm.

In order to realize such a structure, positive electrode slurries containing lithium cobaltate (LCO) having an average particle size of 10 µm, lithium cobaltate (LCO) having an average particle size of 15 µm, and lithium cobaltate (LCO) having an average particle size of 20 µm were provided as the positive electrode slurries for forming the first layer, the second layer, and the third layer. Then, the positive electrode slurry for forming the first layer, the positive electrode slurry for forming the second layer, and the positive electrode slurry for forming the third layer were applied in this order and dried so that the basis weight of each of the layers was one third of that of the positive electrode a1, and then the resulting layer was dried and compressed to produce the positive electrode a5.

The positive electrode a6 is different from the positive electrode a1 in that the positive electrode mixture layer has a three-layer structure having different void rates and different contents of the binder (binder ratios). Specifically, in the thickness direction of the positive electrode mixture layer of the positive electrode a6, a first layer positioned at the current collector side has a void rate of 12%, a second layer positioned at the center has a void rate of 16%, and a third layer positioned at the separator side has a void rate of 20%. The first layer has a binder ratio of 1.5, the second layer has a binder ratio of 2.0, and the third layer has a binder ratio of 2.5.

In order to realize such a structure, materials (LCO, acetylene black, and PVdF) were provided to produce positive electrode slurries for forming the first layer, the second layer, and the third layer, and the weight ratios of LCO:acetylene black:PVdF were 96.5:2:1.5, 96:2:2, and 95.5:2:2.5, respectively. Then, the positive electrode slurry for forming the first layer was applied to both surfaces of an aluminum foil so that the basis weight was one third of that of the positive electrode a1, and the resulting layer was dried and compressed so as to have a void rate of 12% using a roll press machine to form the first layer. Then, the positive electrode slurry for forming the second layer was applied to the top of the first layer so as to have the same thickness as that of the first layer, and the resulting layer was dried and compressed so as to have a void rate of 16% using a roll press machine to form the second layer. Finally, the positive electrode slurry for forming the third layer was applied to the top of the second layer so as to have the same thickness as that of the first and second layers, and the resulting layer was dried and compressed so as to have a void rate of 20% using a roll press machine to form the third layer. Thereafter, the resultant was cut into a predetermined shape to produce the positive electrode a6.

[Negative Electrode]

Six types of negative electrodes b1 to b6 shown in Table 2 were produced.

TABLE 2

| | Characteristics | Layer | Void rate (%) | Conductive auxiliary agent ratio | Binder ratio | Particle size of the active material (μm) |
|---|---|---|---|---|---|---|
| b1 | Standard | — | 25 | 1.0 | 3.0 | 10 |
| b2 | Difference in void rate | Separator side | 30 | 1.0 | 3.0 | 10 |
| | | Center | 25 | | | |
| | | Current collector side | 20 | | | |
| b3 | Difference in content of the conductive auxiliary agent | Separator side | 25 | 0.5 | 3.0 | 10 |
| | | Center | | 1.0 | | |
| | | Current collector side | | 1.5 | | |
| b4 | Difference in content of the binder | Separator side | 25 | 1.0 | 4.0 | 10 |
| | | Center | | | 3.0 | |
| | | Current collector side | | | 2.0 | |
| b5 | Difference in particle size of the active material | Separator side | 25 | 1.0 | 3.0 | 13 |
| | | Center | | | | 10 |
| | | Current collector side | | | | 7 |
| b6 | Difference in void rate and difference in content of the binder | Separator side | 30 | 1.0 | 4.0 | 15 |
| | | Center | 25 | | 3.0 | |
| | | Current collector side | 20 | | 2.0 | |

First, a method of producing the negative electrode b1 will be described. The negative electrode b1 has a substantially uniform structure in the thickness direction of the negative electrode mixture layer.

In order to produce the negative electrode b1, artificial graphite having an average particle size of 10 μm was provided as a negative electrode active material, flake graphite was provided as a conductive auxiliary agent, and carboxymethylcellulose sodium (CMC) and styrene-butadiene rubber (SBR) were provided as binders. These materials were dispersed in water so that the weight ratio of artificial graphite:flake graphite:(CMC+SBR) was 96:1:3 (=1.5+1.5), thereby producing a negative electrode slurry.

Then, the produced negative electrode slurry was applied to both surfaces of a copper foil using a die coater so that the basis weight of one of the surfaces was 12.1 mg/cm$^2$, the resulting layer was dried and compressed so as to have a void rate of 25% using a roll press machine, and the resultant was cut into a predetermined shape to produce the negative electrode b1.

The negative electrodes b2 to b6 shown in Table 2 can be basically produced by the same production method as the negative electrode b1, but, as described later, the negative electrode mixture layer has a three-layer structure and thus it is necessary to apply the negative electrode slurry three times. Hereinafter, a structure different from the negative electrode b1 and a production step thereof will be mainly described.

The negative electrode b2 is different from the negative electrode b1 in that the negative electrode mixture layer has a three-layer structure having different void rates. Specifically, in the thickness direction of the negative electrode mixture layer of the negative electrode b2, a first layer positioned at the current collector side has a void rate of 20%, a second layer positioned at the center has a void rate of 25%, and a third layer positioned at the separator side has a void rate of 30%.

In order to realize such a structure, a negative electrode slurry was produced by the same method as the negative electrode b1, the slurry was applied to both surfaces of a copper foil so that the basis weight was one third of that of the negative electrode b1, and the resulting layer was dried and compressed so as to have a void rate of 20% using a roll press machine to form the first layer. Then, the negative electrode slurry was applied to the top of the first layer so as to have the same thickness as that of the first layer, and the resulting layer was dried and compressed so as to have a void rate of 25% using a roll press machine to form the second layer. Finally, the negative electrode slurry was applied to the top of the second layer so as to have the same thickness as the first and second layers, and the resulting layer was dried and compressed so as to have a void rate of 30% using a roll press machine to form the third layer. Thereafter, the resultant was cut into a predetermined shape to produce the negative electrode b2.

The negative electrode b3 is different from the negative electrode b1 in that the negative electrode mixture layer has a three-layer structure in which the content of the conductive auxiliary agent, i.e., the conductive auxiliary agent ratio, differs. Specifically, in the thickness direction of the negative electrode mixture layer of the negative electrode b3, a first layer positioned at the current collector side has a conductive auxiliary agent ratio of 1.5, a second layer positioned at the center has a conductive auxiliary agent ratio of 1.0, and a third layer positioned at the separator side has a conductive auxiliary agent ratio of 0.5.

In order to realize such a structure, materials (artificial graphite, flake graphite, and (CMC+SBR)) were provided to produce negative electrode slurries for forming the first layer, the second layer, and the third layer, and the weight ratios of artificial graphite:flake graphite:(CMC+SBR) were 95.5:1.5:3, 96:1:3, and 96.5:0.5:3, respectively. Then, the negative electrode slurry for forming the first layer, the negative electrode slurry for forming the second layer, and the negative electrode slurry for forming the third layer were applied in this order and dried so that the basis weight of each of the layers was one third of that of the negative electrode b1, and then the resulting layer was dried and compressed to produce the negative electrode b3.

The negative electrode b4 is different from the negative electrode b1 in that the negative electrode mixture layer has a three-layer structure in which the content of the binder, i.e., the binder ratio, differs. Specifically, in the thickness direction of the negative electrode mixture layer of the negative electrode b4, a first layer positioned at the current collector side has a binder ratio of 2.0, a second layer positioned at the center has a binder ratio of 3.0, and a third layer positioned at the separator side has a binder ratio of 4.0.

In order to realize such a structure, materials (artificial graphite, flake graphite, and (CMC+SBR)) were provided to produce negative electrode slurries for forming the first layer, the second layer, and the third layer, and the weight ratios of artificial graphite:flake graphite:(CMC+SBR) were 97:1:2, 96:1:3, and 95:1:4, respectively. Then, the negative electrode slurry for forming the first layer, the negative electrode slurry for forming the second layer, and the negative electrode slurry for forming the third layer were applied in this order and dried so that the basis weight of each of the layers was one third of that of the negative electrode b1, and then the resulting layer was dried and compressed to produce the negative electrode b4.

The negative electrode b5 is different from the negative electrode b1 in that the negative electrode mixture layer has a three-layer structure including negative electrode active materials having different average particle sizes. Specifically, in the thickness direction of the negative electrode mixture layer of the negative electrode b5, the negative electrode active material in a first layer positioned at the current collector side has an average particle size of 7 µm, and the negative electrode active material in a second layer positioned at the center has an average particle size of 10 µm, and the negative electrode active material in a third layer positioned at the separator side has an average particle size of 13 µm.

In order to realize such a structure, negative electrode slurries containing artificial graphite having an average particle size of 7 µm, artificial graphite having an average particle size of 10 µm, and artificial graphite having an average particle size of 13 µm were provided as the negative electrode slurries for forming the first layer, the second layer, and the third layer. Then, the negative electrode slurry for forming the first layer, the negative electrode slurry for forming the second layer, and the negative electrode slurry for forming the third layer were applied in this order and dried so that the basis weight of each of the layers was one third of that of the negative electrode b1, and then the resulting layer was dried and compressed to produce the negative electrode b5.

The negative electrode b6 is different from the negative electrode b1 in that the negative electrode mixture layer has a three-layer structure having different void rates and different binder ratios. Specifically, in the thickness direction of the negative electrode mixture layer of the negative electrode b6, a first layer positioned at the current collector side has a void rate of 20%, a second layer positioned at the center has a void rate of 25%, and a third layer positioned at the separator side has a void rate of 30%. The first layer has a binder ratio of 2.0, the second layer has a binder ratio of 3.0, and the third layer has a binder ratio of 4.0.

In order to realize such a structure, materials (artificial graphite, flake graphite, and (CMC+SBR)) were provided to produce negative electrode slurries for forming the first layer, the second layer, and the third layer, and the weight ratios of artificial graphite:flake graphite:(CMC+SBR) were 97:1:2, 96:1:3, and 95:1:4, respectively. Then, the negative electrode slurry for forming the first layer was applied to both surfaces of a copper foil so that the basis weight was one third of that of the negative electrode b1, and the resulting layer was dried and compressed so as to have a void rate of 20% using a roll press machine to form the first layer. Then, the negative electrode slurry for forming the second layer was applied to the top of the first layer so as to have the same thickness as that of the first layer, and the resulting layer was dried and compressed so as to have a void rate of 25% using a roll press machine to form the second layer. Finally, the negative electrode slurry for forming the third layer was applied to the top of the second layer so as to have the same thickness as that of the first and second layers, and the resulting layer was dried and compressed so as to have a void rate of 30% using a roll press machine to form the third layer. Thereafter, the resultant was cut into a predetermined shape to produce the negative electrode b6.

[Cell]

A plurality of positive electrodes and a plurality of negative electrodes which were produced by the above method were alternately stacked with separators interposed therebetween. All the positive electrodes were bundled and welded to positive electrode tabs, all the negative electrodes were bundled and welded to negative electrode tabs, and then the welded electrodes were placed in an aluminum laminate cup. Then, an organic electrolytic solution was obtained by dissolving 1 mol of lithium hexafluorophosphate ($LiPF_6$) in 1 liter of a solvent obtained by mixing ethylene carbonate (EC) and ethyl methyl carbonate (EMC) at a volume ratio of 25:75, and the electrolytic solution was injected into the aluminum laminate cup.

Thereafter, the aluminum laminate cup was temporarily vacuum-sealed, and then charged and discharged at 0.2 CA. A gas generated by the charge and discharge processes was released out of the aluminum laminate cup, and then the aluminum laminate cup was fully vacuum-sealed, thereby producing cells having a capacity of 2 Ah. Then, the produced cells were charged to a SOC of 70% and subjected to an aging process at 55° C. for 24 hours, thereby producing cells of Sample Nos. 1 to 9 shown in Table 3.

TABLE 3

| Sample No. | Target type of resistance | Resistance contribution rate | Different type of the structure in the thickness direction | $\Delta c$ | Capacity retention rate (%) |
|---|---|---|---|---|---|
| *1 | — | — | | 0.21 | 56 |
| *2 | (1) Diffusion resistance of Li ions in the electrolytic solution | 12% (3) | Void rate | 0.16 | 62 |
|    | (2) Ohmic resistance of the electrolytic solution | 5% (4) | | | |
| *3 | (3) Ohmic resistance of the positive electrode mixture layer | 0% (6) | Content of the conductive auxiliary agent | 0.20 | 55 |
| *4 | (4) Ohmic resistance of the negative electrode mixture layer | 0% (8) | Content of the conductive auxiliary agent | 0.21 | 57 |

TABLE 3-continued

| Sample No. | Target type of resistance | Resistance contribution rate | Different type of the structure in the thickness direction | Δc | Capacity retention rate (%) |
|---|---|---|---|---|---|
| *5 | (5) Reaction resistance on the surface of the positive electrode active material | 32% (2) | Content of the binder | 0.14 | 67 |
| *6 | (6) Reaction resistance on the surface of the negative electrode active material | 50% (1) | Content of the binder | 0.13 | 71 |
| *7 | (7) Diffusion resistance of Li ions in the positive electrode mixture layer | 0% (7) | Particle size of the active material | 0.20 | 58 |
| *8 | (8) Diffusion resistance of Li ions in the negative electrode mixture layer | 1% (5) | Particle size of the active material | 0.19 | 61 |
| 9 | (6) + (5) + (1) | — | Content of the binder + void rate | 0.08 | 89 |

In Table 3, cells whose sample numbers are marked with asterisks (i.e., the cells of Sample Nos. 1 to 8) do not satisfy the requirements of the present invention. Further, the cell of Sample No. 9 with no asterisk satisfies the requirements of the present invention.

Here, fitting was performed by changing various parameters such as diffusion coefficient, exchange current, activation energy, electrical conductivity, and tortuosity using the battery simulator "Battery Design Studio" (manufactured by CD-adapco) so that battery characteristics such as C-rate dependency and temperature dependency during charge and discharge were adjusted to the measured values, as a result of which the simulation model of this battery system was created.

Then, various resistance components when charged with a current of 1 C (i.e., resistance values of the resistance components (1) to (8)) were determined using the simulation model created for the cell of Sample No. 1, and a resistance contribution rate (i.e., a proportion of each of the resistance values to the total resistance values) was obtained. The cell of Sample No. 1 is a cell produced using the positive electrode a1 and the negative electrode b1, and the structure in the thickness direction of the positive electrode mixture layer of the positive electrode a1 and the negative electrode mixture layer of the negative electrode b1 is substantially uniform.

The resistance contribution rates of the resistance components (1) to (8) are described below. In this regard, the resistance contribution rates are rounded to the nearest whole number. Further, the numbers in parentheses after the resistance contribution rate indicate the order when the resistance contribution rates are arranged in descending order:

(1) Diffusion resistance of lithium ions in the nonaqueous electrolytic solution: 12% (3)
(2) Ohmic resistance of the nonaqueous electrolytic solution: 5% (4)
(3) Ohmic resistance of the positive electrode mixture layer: 0% (6)
(4) Ohmic resistance of the negative electrode mixture layer: 0% (8)
(5) Reaction resistance on the surface of the positive electrode active material: 32% (2)
(6) Reaction resistance on the surface of the negative electrode active material: 50% (1)
(7) Diffusion resistance of lithium ions in the positive electrode mixture layer: 0% (7)
(8) Diffusion resistance of lithium ions in the negative electrode mixture layer: 1% (5)

In Table 3, the cell of Sample No. 2 is a cell produced by using the positive electrode a2 and the negative electrode b2 to reduce "(1) Diffusion resistance of lithium ions in the nonaqueous electrolytic solution" and "(2) Ohmic resistance of the nonaqueous electrolytic solution". In the positive electrode mixture layer of the positive electrode a2 and the negative electrode mixture layer of the negative electrode b2, the void rate at the position nearest the current collector is lower than that at the position nearest the separator.

The cell of Sample No. 3 is a cell produced by using the positive electrode a3 and the negative electrode b1 to reduce "(3) Ohmic resistance of the positive electrode mixture layer", and the content of the conductive auxiliary agent in the positive electrode mixture layer of the positive electrode a3 at the position nearest the positive electrode current collector is larger than that at the position nearest the separator.

The cell of Sample No. 4 is a cell produced by using the positive electrode a1 and the negative electrode b3 to reduce "(4) Ohmic resistance of the negative electrode mixture layer", and the content of the conductive auxiliary agent in the negative electrode mixture layer of the negative electrode b3 at the position nearest the negative electrode current collector is larger than that at the position nearest the separator.

The cell of Sample No. 5 is a cell produced by using the positive electrode a4 and the negative electrode b1 to reduce "(5) Reaction resistance on the surface of the positive electrode active material", and the content of the binder in the positive electrode mixture layer of the positive electrode a4 at the position nearest the positive electrode current collector is smaller than that at the position nearest the separator.

The cell of Sample No. 6 is a cell produced using the positive electrode a1 and the negative electrode b4 to reduce "(6) Reaction resistance on the surface of the negative electrode active material", and the content of the binder in the negative electrode mixture layer of the negative electrode b4 at the position nearest the negative electrode current collector is smaller than that at the position nearest the separator.

The cell of Sample Number 7 is a cell produced by using the positive electrode a5 and the negative electrode b1 to reduce "(7) Diffusion resistance of lithium ions in the positive electrode mixture layer", and the particle size of the positive electrode active material in the positive electrode mixture layer of the positive electrode a5 at the position nearest the positive electrode current collector is smaller than that at the position nearest the separator.

The cell of Sample No. 8 is a cell produced by using the positive electrode a1 and the negative electrode b5 to reduce "(8) Diffusion resistance of lithium ions in the negative electrode mixture layer", and the particle size of the negative electrode active material in the negative electrode mixture layer of the negative electrode b5 at the position nearest the negative electrode current collector is smaller than that at the position nearest the separator.

The cell of Sample No. 9 is a cell produced by using the positive electrode a6 and the negative electrode b6 to reduce the top three resistance components having large resistance values among the eight resistance components (1) to (8), i.e., the resistance components (6), (5), and (1). In the case of the cell of Sample No. 9, in the positive electrode mixture layer of the positive electrode a6 and the negative electrode mixture layer of the negative electrode b6, the void rate at the position nearest the current collector is smaller than that at the position nearest the separator, and the content of the binder in the mixture layer at the position nearest the current collector is smaller than that at the position nearest the separator.

Regarding the cells of Sample Nos. 1 to 9, when constant-current charge was performed at a current of 1 C until a voltage at a SOC of 0% reached a predetermined upper limit voltage and the lithium ion concentration in the positive electrode active material at a SOC of 0% was defined as 1.0, the difference Δc in solid phase lithium ion concentration between the position nearest the separator of the negative electrode and the position nearest the negative electrode current collector was determined using the simulator. The difference Δc in the lithium ion concentration can be obtained by subtracting the lithium ion concentration at the position nearest the negative electrode current collector from the lithium ion concentration at the position nearest the separator of the negative electrode, in the negative electrode mixture layer. Table 3 also shows the difference Δc in lithium ion concentration which was determined for each of the cells of Sample Nos. 1 to 9.

The difference Δc in lithium ion concentration was determined for the negative electrode, because, in the cell of this example, the difference Δc in lithium ion concentration was larger in the negative electrode than in the positive electrode. Therefore, in a cell in which the difference Δc in lithium ion concentration is larger in the positive electrode than in the negative electrode, the difference Δc in lithium ion concentration may be determined for the positive electrode.

Further, the cells of Sample Nos. 1 to 9 after the aging process were subjected to 200 cycles of full charge and discharge (at 45° C. and a current of 0.7 C) in a voltage range of 3.00 V or more and 4.35 V or less, and then the capacity retention rates of the cells were measured. Table 3 also shows the determined capacity retention rates of the cells of Sample Nos. 1 to 9. The target value of the capacity retention rate is 85%.

As described above, each of the cells of Sample Nos. 2 to 8 had a structure for reducing any one of the resistance components (1) to (8), as a result of which the difference Δc in solid phase lithium ion concentration between the position nearest the current collector of the electrode and the position nearest the separator was basically decreased, and the capacity retention rate was increased, as compared with the cell of Sample No. 1 in which the structure in the thickness direction of the positive electrode mixture layer and the negative electrode mixture layer was substantially uniform. Particularly, in the cells having a structure for reducing the resistance contribution rate (i.e., the cells of Sample Nos. 6 and 5), the capacity retention rates were as high as 71% and 67%, respectively.

However, the cells of Sample Nos. 2 to 8 each have a capacity retention rate of less than 85%, and the rate does not reach the target value.

On the other hand, in the cell of Sample No. 9, the difference Δc in solid phase lithium ion concentration between the position nearest the current collector of the mixture layer and the position nearest the separator was 0.08 (i.e., 0.1 or less), and the capacity retention rate was 89% (i.e., the target value or more).

As described above, the cell of Sample No. 9 has a structure in which, in both the positive electrode mixture layer and the negative electrode mixture layer, the void rate at the position nearest the current collector is smaller than that at the position nearest the separator, and the content of the binder in the mixture layer at the position nearest the current collector is smaller than that at the position nearest the separator, in order to reduce the top three resistance components having large resistance values among the eight resistance components (1) to (8) (i.e., the resistance components (6), (5), and (1)). Hence, in the cell of Sample No. 9, among resistance values of the top three resistance components having large resistance values (i.e., the resistance components (6), (5), and (1)), the values at the position of the mixture layer nearest the current collector are smaller than those at the position of the mixture layer nearest the separator.

In the cell of Sample No. 9, the cell in a case in which the structure in the thickness direction of the mixture layer of the electrode is substantially uniform corresponds to the cell of Sample No. 1, and the difference Δc in lithium ion concentration of the cell of Sample No. 1 is 0.21 and larger than 0.1.

That is, the cell of Sample No. 9 is a cell satisfying the requirements of the present invention in which, among resistance values of at least three of the following eight resistance components:

(1) diffusion resistance of lithium ions in the nonaqueous electrolytic solution which permeates at least one of the positive electrode and the negative electrode;

(2) ohmic resistance of the nonaqueous electrolytic solution which permeates at least one of the positive electrode and the negative electrode;

(3) ohmic resistance of the positive electrode mixture layer;

(4) ohmic resistance of the negative electrode mixture layer, (5) reaction resistance on a surface of the positive electrode active material;

(6) reaction resistance on a surface of the negative electrode active material;

(7) diffusion resistance of lithium ions in the positive electrode mixture layer; and (8) diffusion resistance of lithium ions in the negative electrode mixture layer, the values at a position of a mixture layer nearest a current collector are smaller than the values at a position of a mixture layer nearest the separator, when constant-current charge is performed at a current of 1 C until a voltage at a SOC of 0% reaches a predetermined upper limit voltage and a lithium ion concentration in a positive electrode active material at a SOC of 0% is defined as 1.0, a difference Δc in solid phase lithium ion concentration between the position of the mixture layer nearest the current collector and the position of the mixture layer nearest the separator is 0.1 or less, and in a case in which a structure in a thickness direction of the mixture layer is substantially uniform, the at least three resistance components include the top three resistance components having large resistance values among the eight resistance components.

The structure of the material layer is examined and the battery simulator is used to perform simulation under the conditions in which the structure in the thickness direction of the material layer is substantially uniform, whereby it is possible to judge whether or not the requirement "in a case in which the structure in the thickness direction of the mixture layer of the electrode is substantially uniform, and when constant-current charge is performed at a current of 1 C until the voltage at a SOC of 0% reaches the predetermined upper limit voltage, the difference Δc in solid phase lithium ion concentration between the position nearest the separator and the position nearest the current collector is 0.1 or less" is satisfied.

Further, it is possible to use the battery simulator to examine the top three resistance components having large resistance values in a case in which the structure in the thickness direction of the mixture layer of the electrode is substantially uniform.

The present invention is not limited to the above embodiments, and various applications and modifications can be added within the scope of the present invention.

In the embodiments, a lithium ion secondary battery having a structure in which a stacked body formed by alternately stacking a plurality of positive electrodes and a plurality of negative electrodes with a separator interposed therebetween and a nonaqueous electrolytic solution are housed in an exterior body has been described as an example, however, the structure of the lithium ion secondary battery according to the present invention is not limited to the above structure. For example, the lithium ion secondary battery may have a structure in which a wound body formed by winding a positive electrode and a negative electrode stacked with a separator interposed therebetween and a nonaqueous electrolytic solution are housed in an exterior body. Further, the exterior body may be not a laminate case, but a metal can.

In the examples, it may be configured such that the resistance values of the top three resistance components having large resistance values among the eight resistance components (1) to (8) at the position of the mixture layer nearest the current collector are smaller than those at the position of the mixture layer nearest the separator, however, it may be configured such that the resistance values of the rank four or lower at the position of the mixture layer nearest the current collector are smaller than those at the position of the mixture layer nearest the separator.

In the examples, it may be configured such that, in the positive electrode mixture layer and the negative electrode mixture layer, the void rate at the position nearest the current collector is lower than that at the position nearest the separator in order to reduce "(1) Diffusion resistance of lithium ions in the nonaqueous electrolytic solution" and "(2) Ohmic resistance of the nonaqueous electrolytic solution", however, it may be configured such that in either the positive electrode mixture layer or the negative electrode mixture layer, the void rate at the position nearest the current collector is lower than that at the position nearest the separator.

In the examples, in a case in which the structure in the thickness direction of the mixture layer of the electrode is substantially uniform, the resistance values of the top three resistance components having large values among the resistance components (1) to (8) decrease in three stages, in the order of the position of the mixture layer nearest the separator, the position nearest the center in the thickness direction of the mixture layer, and the position nearest the current collector. However, the mixture layer may have a two-layer structure in which the resistance values at the position nearest the current collector is smaller than those at the position nearest the separator.

Alternatively, the mixture layer may have a structure of four or more layers in which, in the thickness direction of the mixture layer, the resistance values decrease as approaching the position nearest the current collector from the position nearest the separator. In this case, the resistance values may decrease in stages or may decrease steplessly and continuously.

DESCRIPTION OF REFERENCE SYMBOLS

10: Stacked body
11: Positive electrode
12: Negative electrode
13: Separator
14: Nonaqueous electrolytic solution
20: Laminate case
21: Positive electrode current collector
22: Positive electrode mixture layer
31: Negative electrode current collector
32: Negative electrode mixture layer
100: Lithium ion secondary battery

The invention claimed is:

1. A lithium ion secondary battery comprising:
a positive electrode;
a negative electrode, wherein each of the positive electrode and the negative electrode have a current collector and a mixture layer on a surface of the current collector and which contains an active material;
a separator between the positive electrode and the negative electrode; and
a nonaqueous electrolytic solution,
wherein, among resistance values of at least three of the following eight resistance components:
(1) diffusion resistance of lithium ions in the nonaqueous electrolytic solution which permeates at least one of the positive electrode and the negative electrode;
(2) ohmic resistance of the nonaqueous electrolytic solution which permeates at least one of the positive electrode and the negative electrode;
(3) ohmic resistance of the mixture layer of the positive electrode;
(4) ohmic resistance of the mixture layer of the negative electrode;
(5) reaction resistance on a surface of the active material of the positive electrode;
(6) reaction resistance on a surface of the active material of the negative electrode;

(7) diffusion resistance of lithium ions in the mixture layer of the positive electrode; and
(8) diffusion resistance of lithium ions in the mixture layer of the negative electrode, in at least one of the positive electrode or the negative electrode, first resistance values at a first position of the mixture layer nearest the current collector are smaller than second resistance values at a second position of the mixture layer nearest the separator, the first position and the second position being relative to a center of the mixture layer, when a constant-current charge is performed at a current of 1 C until a voltage at a state of charge of 0% reaches a predetermined upper limit voltage and a lithium ion concentration in the active material of the positive electrode at a state of charge of 0% is defined as 1.0, a difference $\Delta c$ in solid phase lithium ion concentration between the mixture layer at the second position nearest the separator and the mixture layer at the first position nearest the current collector is 0.1 or less, and when a structure of the lithium ion secondary battery is substantially uniform in a thickness direction of the mixture layer, the at least three resistance components are the resistance components having largest resistance values among the eight resistance components, and wherein, the lithium ion secondary battery has at least two of:

(a) in the at least one of the positive electrode or the negative electrode, a first void rate in the mixture layer at a first position nearest the current collector is lower than a second void rate in the mixture layer at a second position nearest the separator, the first position and the second position being relative to a center of the mixture layer;

(b) a first content of a conductive auxiliary agent in the mixture layer of the positive electrode at the first position nearest the current collector of the positive electrode is larger than a second content of the conductive auxiliary agent in the mixture layer of the positive electrode at the second position nearest the separator;

(c) a first content of a conductive auxiliary agent in the mixture layer of the negative electrode at the first position nearest the current collector of the negative electrode is larger than a second content of the conductive auxiliary agent in the mixture layer of the negative electrode at the second position nearest the separator;

(d) a first content of a binder in the mixture layer of the positive electrode at the first position nearest the current collector of the positive electrode is smaller than a second content of the binder in the mixture layer of the positive electrode at the second position nearest the separator;

(e) a first content of a binder in the mixture layer of the negative electrode at the first position nearest the current collector of the negative electrode is smaller than a second content of the binder in the mixture layer of the negative electrode at the second position nearest the separator;

(f) a first particle size of the active material of the positive electrode at the first position nearest the current collector of the positive electrode is smaller than a second particle size of the active material of the positive electrode at the second position nearest the separator; and (g) a first particle size of the active material of the negative electrode at the first position nearest the current collector of the negative electrode is smaller than a second particle size of the active material of the negative electrode at the second position nearest the separator.

2. The lithium ion secondary battery according to claim 1, wherein, one of the at least three resistance components is the resistance component (1), and the lithium ion secondary battery has at least (a) a first void rate in the mixture layer at the first position nearest the current collector is lower than a second void rate in the mixture layer at the second position nearest the separator.

3. The lithium ion secondary battery according to claim 1, wherein, one of the at least three resistance components is the resistance component (2), and the lithium ion secondary battery has at least (a).

4. The lithium ion secondary battery according to claim 1, wherein, one of the at least three resistance components is the resistance component (3), and the lithium ion secondary battery has at least (b).

5. The lithium ion secondary battery according to claim 1, wherein, one of the at least three resistance components is the resistance component (4), and the lithium ion secondary battery has at least (c).

6. The lithium ion secondary battery according to claim 1, wherein, one of the at least three resistance components is the resistance component (5), and the lithium ion secondary battery has at least (d).

7. The lithium ion secondary battery according to claim 1, wherein, one of the at least three resistance components is the resistance component (6), and the lithium ion secondary battery has at least (e) a first content of a binder in the mixture layer of the negative electrode at the first position nearest the current collector of the negative electrode is smaller than a second content of the binder in the mixture layer of the negative electrode at the second position nearest the separator.

8. The lithium ion secondary battery according to claim 1, wherein, one of the at least three resistance components is the resistance component (7), and the lithium ion secondary battery has at least (f).

9. The lithium ion secondary battery according to claim 1, wherein, one of the at least three resistance components is the resistance component (8), and the lithium ion secondary battery has at least (g).

10. The lithium ion secondary battery according to claim 1, wherein, in the thickness direction of the mixture layer, the resistance values of the at least three resistance components decrease in at least three stages as measured from the second position nearest the separator towards the first position nearest the current collector.

* * * * *